(12) United States Patent
Box

(10) Patent No.: US 6,474,626 B1
(45) Date of Patent: Nov. 5, 2002

(54) LAWN MOWER RACK

(76) Inventor: Clyde Box, 6560 E. 25th Pl., Tulsa, OK (US) 74129

( * ) Notice: Subject to any disclaimer, the term of this patent is extended or adjusted under 35 U.S.C. 154(b) by 0 days.

(21) Appl. No.: 10/005,427

(22) Filed: Dec. 4, 2001

(51) Int. Cl.$^7$ ................................................. B66F 3/00
(52) U.S. Cl. ...................... 254/131; 254/120; 254/124; 254/3 B; 254/4 R; 414/490
(58) Field of Search ................... 254/137, 120, 254/122–124, 10 R, 10 C, 3 B; 248/166, 436; 211/81, 96, 168

(56) References Cited

U.S. PATENT DOCUMENTS

| | | |
|---|---|---|
| 1,510,209 A | 9/1924 | Christman |
| 3,618,894 A * | 11/1971 | Meyer ........................ 254/8 R |
| 3,747,778 A | 7/1973 | Collins, Jr. |
| 3,863,890 A * | 2/1975 | Ruffing ..................... 254/10 C |
| 3,964,729 A | 6/1976 | Harlow |
| 4,088,303 A * | 5/1978 | Aquila ........................ 254/88 |
| 4,549,721 A * | 10/1985 | Stone ......................... 254/126 |
| 4,632,627 A * | 12/1986 | Swallows ................... 414/490 |
| 4,958,804 A | 9/1990 | Lenius et al. |
| 5,000,423 A | 3/1991 | Snickers |
| 5,174,711 A * | 12/1992 | Binder ........................ 414/678 |
| 5,232,203 A | 8/1993 | Butts |
| 5,632,475 A | 5/1997 | McCanse |
| 5,678,804 A * | 10/1997 | Lintleman ................... 254/131 |
| 5,769,396 A | 6/1998 | Tischendorf |
| 5,826,857 A | 10/1998 | Brack et al. |
| 5,871,070 A | 2/1999 | Contreras |
| 5,971,360 A | 10/1999 | Sinsley |
| 6,015,254 A | 1/2000 | Keeler |
| 6,139,247 A | 10/2000 | Wright |
| 6,345,807 B1 * | 2/2002 | Cacciatore ................. 254/3 B |

* cited by examiner

*Primary Examiner*—Joseph J. Hail, III
*Assistant Examiner*—Daniel Shanley
(74) *Attorney, Agent, or Firm*—Gable & Gotwals; Paul H. Johnson

(57) ABSTRACT

A lawn mower rack is formed of a structural base for resting on a support surface. First and second spaced apart longitudinal rails supported by the base and adapted to receive wheels of a lawn mower thereon. A first manually operated lifter is provided for elevationally supporting rearward portions of the longitudinal rails above the base and a second manually operated lifter, independent of the first lifter, is provided for elevationally supporting forward portions of the longitudinal rails above the base so that thereby only approximately one half of the weight of a lawn mower need be lifted at a time.

7 Claims, 2 Drawing Sheets

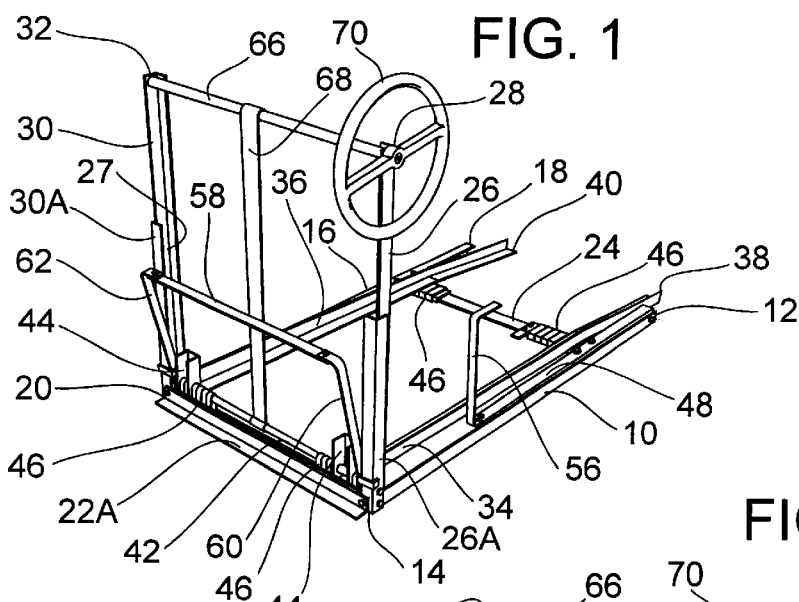
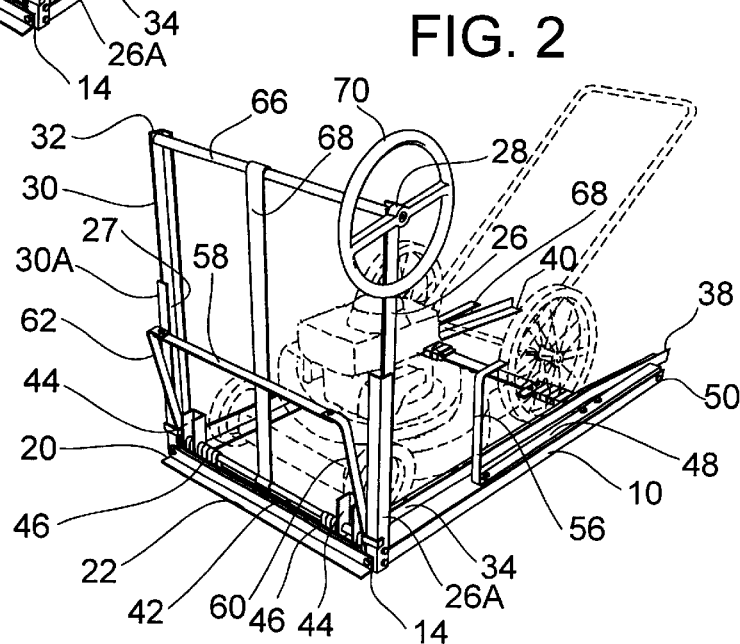
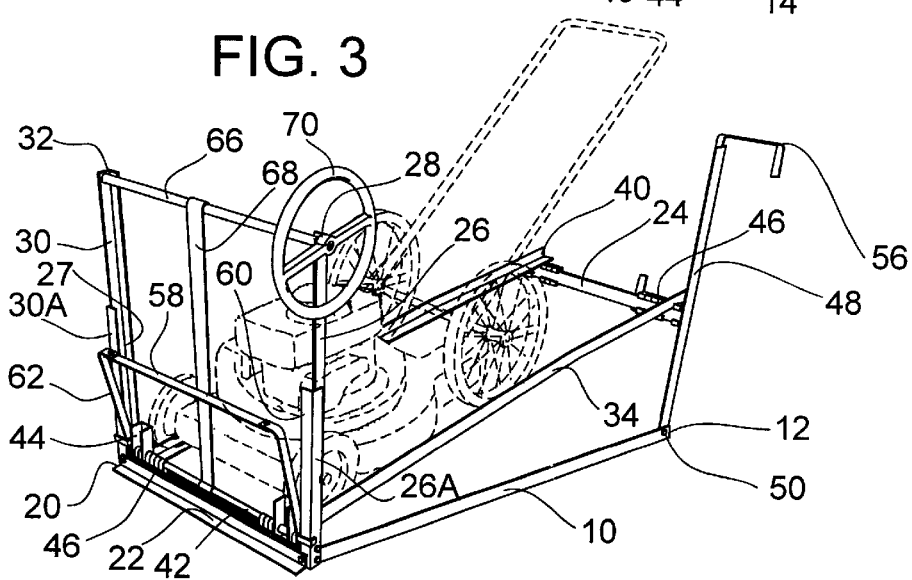

LAWN MOWER RACK

REFERENCE TO PENDING APPLICATIONS

This application is not related to any pending United States or international patent application.

FIELD OF THE INVENTION

This invention relates to a lawn mower rack for supporting a lawn mower in an elevated position to improve the convenience of repair and maintenance. Particularly, the invention herein provides a rack onto which a lawn mower can be rolled and subsequently the rack operates in a way to first lift one end of the lawn mower followed by lifting a second end of the lawn mower so that only about one-half of the weight of the lawn mower must be raised at one time. The lawn mower, when in a raised position, provides a convenient way for a user to drain oil from the motor engine and to replace or repair the mower blades. The device is particularly useful to aid a user in removing lawn mower blades so that they can sharpened and replaced in a safe and convenient manner and without the necessity of tilting the lawn mower from the horizontal so that oil from the crank case or fuel from the gas tank is not spilled.

BACKGROUND OF THE INVENTION

Others have provided devices for supporting lawn mowers in an elevated position such as represented by U.S. Pat. No. 4,958,804. This patent teaches the concept of a base with a parallelogram pivoted structure. The lawn mower can be rolled on the structure and thereafter the structure pivoted with respect to the base so that the lawn mower is elevationally positioned to enable a worker to have access to the underneath side of the mower. One difficulty with the type of lawn mower service lift revealed in U.S. Pat. No. 4,958,804 is so that the total weight of the lawn mower is elevated at one time. The present invention provides an improved rack for a lawn mower wherein the user is required to lift only one-half of the weight of the mower at one time so as to reduce by fifty percent the maximum lift that is required to move a lawn mower from a lower to an upper elevated position for servicing.

For additional background information relating to lift devices particularly related to small engine equipment, reference may be had to the following previously issued U.S. Patents:

| U.S. PAT. NO. | INVENTOR | TITLE |
| --- | --- | --- |
| 1,510,209 | Christman | Automobile Hoist |
| 3,747,778 | Collins, Jr. | Snowmobile Hoist |
| 3,964,729 | Harlow | Elevating Device for Snowmobiles |
| 4,958,804 | Lenius et al. | Lawn Mower Service Lift |
| 5,000,423 | Snickers | Small Vehicle Lift |
| 5,232,203 | Butts | Jack for Light Aircraft |
| 5,632,475 | McCanse | Work Holding Apparatus |
| 5,769,396 | Tischendorf | Multi-Purpose Motorcycle Lift |
| 5,826,857 | Brack et al. | Light Vehicle Service Stand |
| 5,871,070 | Contreras | Overhead Storage Lift Assembly |
| 5,971,360 | Sinsley | Lifting Apparatus for Lawn Mower Equipment |
| 6,015,254 | Keeler | Snowmobile Lift Cart and Methods of Constructing and Utilizing Same |
| 6,139,247 | Wright | Tiltable Hauling Device |

BRIEF SUMMARY OF THE INVENTION

The invention herein relates to a lawn mower rack formed of a structural base for resting on a support surface with first and second spaced apart rails supported by the base and adapted to receive wheels of a lawn mower thereon. A first lifter is used for elevationally supporting a rearward portion of the rails and a second lifter for elevationally supporting forward portions of the rails. In this way, a lawn mower can be elevated into position for servicing wherein the user is required to lift only about one-half the weight of the mower at any time.

The lawn mower rack includes a rectangular structural base having opposed paralleled longitudinal frame members, a forward end and a rearward end. First and second spaced apart parallel rails are supported to the base. The rails are configured to receive the wheels of a lawn mower thereon.

A lifting frame is pivotally supported at the structural base rearward end for elevationally raising a rearward portion of the rails and thereby raising a rearward portion of a lawn mower positioned on the rails. A lifter is supported at the forward end of the base for elevationally raising a forward portion of the rails and thereby a forward portion of a lawn mower positioned on it.

A more complete understanding of the invention will be obtained from the following detailed description of the preferred embodiment and the claims, taken in conjunction with the attached drawings.

DESCRIPTION OF THE DRAWINGS

FIG. 1 is an isometric elevational view of a lawn mower rack of this invention in the stored or rest position as when the rack is not in use to support a lawn mower.

FIG. 2 is an isometric elevational view as in FIG. 1 showing a lawn mower in dotted outline positioned on the rack.

FIG. 3 shows the first step in elevationally raising the lawn mower. In FIG. 3, the rearward portion of longitudinal rails have been raised whereas the forward portion of the rails remain at their lower positions meaning that to go from the situation as shown in FIG. 2 to that shown in FIG. 3, the user is required to lift only approximately one-half of the weight of the lawn mower.

FIG. 4 shows the lawn mower in position to be serviced or repaired.

DETAILED DESCRIPTION OF A PREFERRED EMBODIMENT

Figure 4:
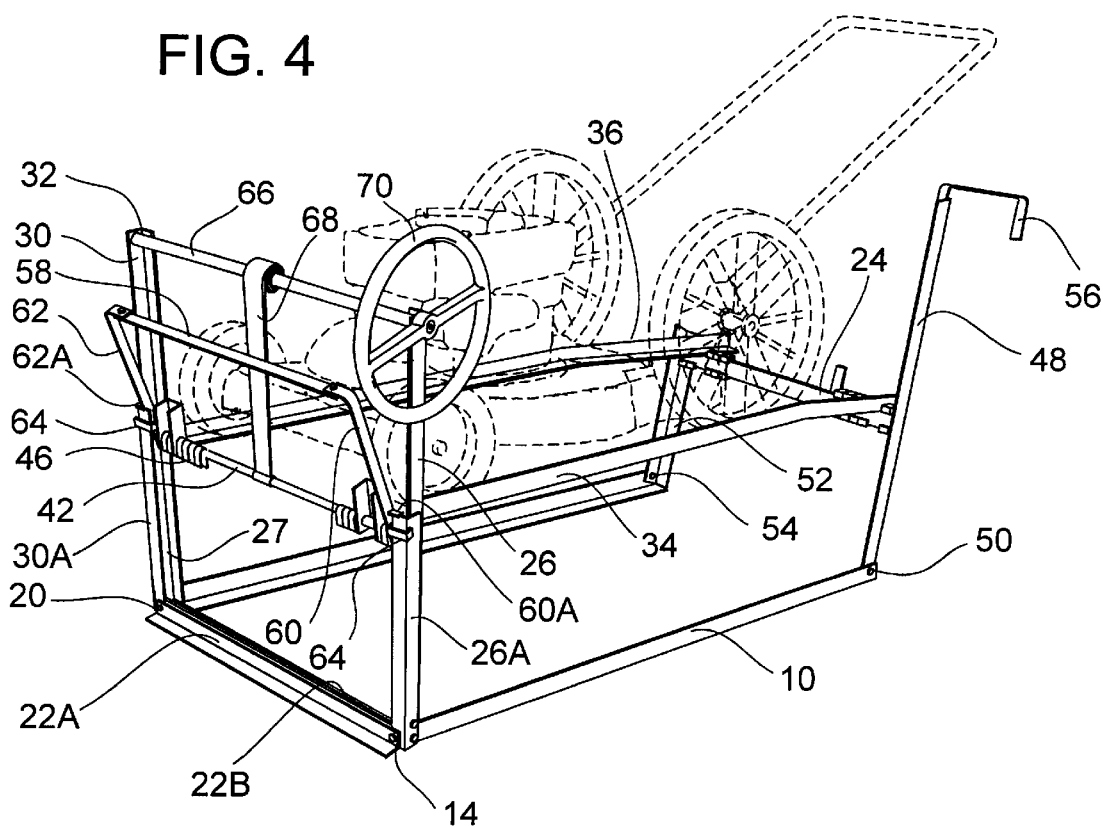
FIG. 4 is an isometric view of the lawn mower rack with a lawn mower supported thereon and showing the forward portion of the longitudinal rails in elevated positions. In going from the position as shown in FIG. 3 to the position shown in FIG. 4 requires lifting only about one-half of the weight of the lawn mower.

Referring first to FIG. 1, an isometric elevational view of a lawn mower rack according to this invention is shown. The lawn mower rack includes a base resting on a support surface such as a floor. The base includes a first longitudinal frame member 10 which may be any kind of structural member, preferably a metal and preferably angle iron because of its ready availability, economy and strength. Structural frame member 10 has a rearward end 12 and a forward end 14. A second longitudinal frame member 16 is of the same length as first longitudinal member 10 and is spaced from and parallel to first longitudinal member 10. Second longitudinal frame member 16 has a rearward end 18 and a forward end 20. Interconnecting the forward ends 14 and 20 of longitudinal frame members 10 and 16 are paralleled lateral frame members 22A and 22B.

Longitudinal frame members 10 and 16 and lateral frame members 22 and 24 form a base for the lawn mower rack.

Extending uprightly from first longitudinal frame member 10 at the forward end 14 thereof is a first front post 26 having an upper end 28. In like manner, extending uprightly from the forward end 20 of second longitudinal frame member 16 is a second front post 30 with an upper end 32.

Resting on the base is a first longitudinal rail 34 and a spaced apart paralleled second longitudinal rail 36. Rails 34 and 36 are preferably formed of structural members such as angle iron and are configured to receive the wheels of a lawn mower thereon as shown in FIGS. 2–5. First longitudinal rail 34 has a rearward end 38 and second longitudinal rail 36 has a rearward end 40. Each of the rails 34 and 36 has a forward end that pivotally receives a lateral rod member 42. Extending beneath longitudinal rails 34 and 36 adjacent but spaced from their rearward ends 38 and 40 is a lateral member 24.

In parallel with first front post 26 is a shorter length first support leg 26A and in like manner a second support leg 30A extends in parallel with second front post 30. Both the front posts and the support legs are preferably formed of angle iron as shown providing a vertical guide slot 27 therebetween.

End portions of latter rod member 42 are slidably received in these vertical guide slots. A spacer tube is received on lateral rod member 42.

Affixed to the forward ends of each of the longitudinal rail members 34 and 36 is a short upwardly extending stop member 44. Lateral rod member 42 extends through openings formed in stop members 44.

The spacing width between longitudinal rail 34 and 36 may be varied by slidably positioning them on lateral rod member 42 and lateral member 24. Spacers 46 are employed to maintain the proper spacing between longitudinal rails 34 and 36.

A lifting frame is pivotally supported at the rearward ends of longitudinal frame members 10 and 16. An elongated first lifting frame strut 48 is pivoted to front longitudinal frame member 10 adjacent rearward end 12 thereof, about a pivot bolt 50. A shorter length lifting frame strut 52 (see FIG. 4) is pivotally supported at one end to second longitudinal frame member 16 adjacent its rearward end 18 and pivoted about a bolt 54. The second lateral frame member 24 extends between lifting frame struts 48 and 52.

At the upper end of lifting frame strut 48 is a laterally extending handle 56. Handle 56 is utilized for pivoting the lifting frame consisting of struts 48 and 52 and lateral member 24. Lateral member 24 extends beneath first and second longitudinal rails 34 and 36, therefore, when the lifting frame is pivoted from its horizontal position as shown in FIGS. 1 and 2 to its vertical position as shown in FIGS. 3, 4 and 5, the rearward end portions of both of the longitudinal rails 34 and 36 are elevated while the forward end portions remain at their lower positions.

Extending upwardly from lateral rod member 42 is a U-shaped lifting bar formed of horizontal lifting bar portion 58 and downwardly extending end portions 60 and 62. The lifting bar makes a convenient way of elevating the forward ends of longitudinal rails 34 and 36. When a lawn mower is in position as shown in FIG. 3, the next step in raising the entire mower is for the user to grasp lift bar 58 and lift it to thereby raise the forward ends of longitudinal rails 34 and 36 to horizontal positions as shown in FIGS. 4 and 5. A hook 60A is secured at the bottom of end portion 60 and a hook 62A is secured at the bottom of end portion 62.

Figure 5:
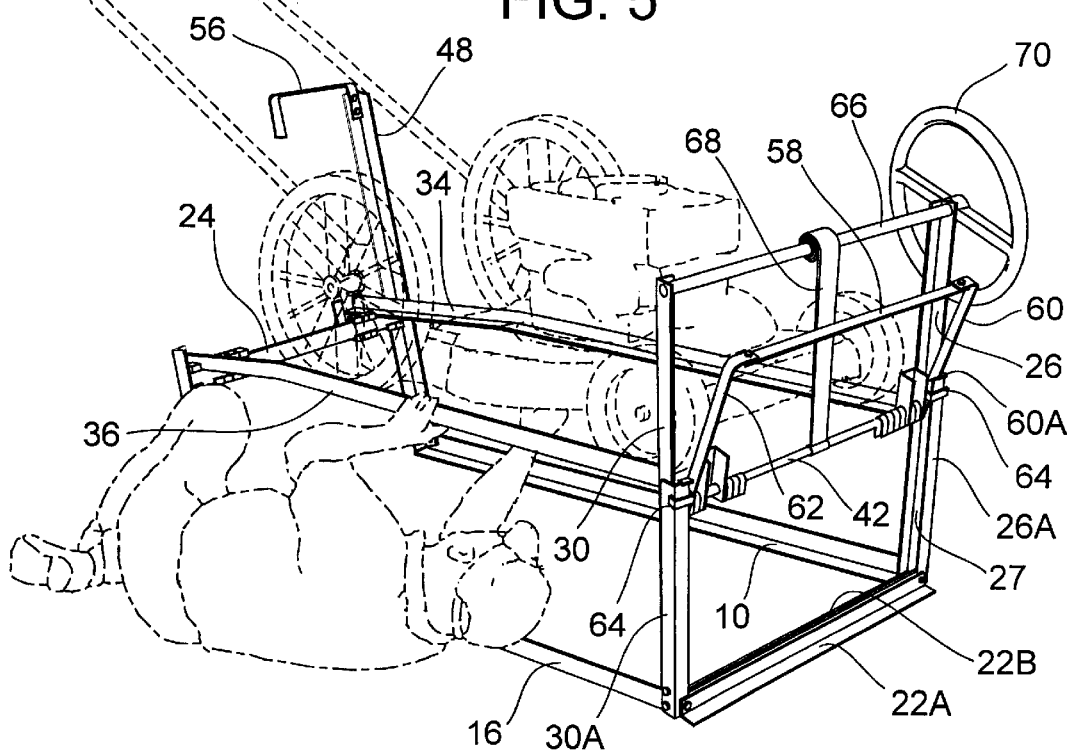
FIG. 5 is an elevational isometric view showing the lawn mower rack in its raised position with a lawn mower thereon and showing in dotted outline a workman using the lawn mower rack for servicing the lawn mower.

When longitudinal rails 34 and 36 are raised to their upper positions as shown in FIGS. 4 and 5, hook 60A is positioned over the top end of first support leg 26A and hook 62A is positioned over the top end of second support leg 30A.

The embodiment of the invention illustrated in the drawings shows a second means of raising the forward end portions of longitudinal rails 34 and 36 that support the lawn mower. For this purpose there is provided a horizontal shaft 66 that extends rotatably between upper portions of posts 26 and 30. A flexible web 68 (which could be a rope however a web is preferable) has an upper end portion affixed to and wound around shaft 66. A lower end of web 68 is secured to lateral frame member 42. Thus, to raise the forward end of longitudinal rails 34 and 36 from their lower positions as shown in FIGS. 1, 2 and 3 to their upper positions as shown in FIGS. 4 and 5 so that hooks 60A and 62A can be latched over the upper ends of support legs 26A and 30A, a user can rotate shaft 66 to wind an upper portion of web 68 thereon. To facilitate rotating shaft 66, a crank can be secured to the shaft. In an illustrated arrangement, the crank is in the form of a wheel 70. When wheel 70 is turned, web 68 is wound on shaft 66 and the forward ends of longitudinal rails are lifted to the horizontal positions as seen in FIGS. 4 and 5.

FIGS. 4 and 5 show the lawn mower rack in the upper or operative position and shows in dotted outline a lawn mower thereon. With a lawn mower in the upper position as shown in FIGS. 4 and 5, a workman has access to the area beneath the mower to allow the workman to drain oil from the mower engine when it is necessary to replace the oil and to remove or install blades. It is frequently necessary to sharpen lawn mower blades. Access to lawn mower blades is difficult, particularly when it is remembered that a lawn mower having a gasoline powered engine cannot be indiscriminately inverted to expose the underside since to do so would spill oil and gasoline from the engine. The lift rack illustrated in the drawing simplifies the task of removing and replacing lawn mower blades.

After repairs are completed the lawn mower can easily be lowered back to the support surface for removal from the rack. This is done by releasing hooks 60A and 62A from the upper ends of support legs 26A and 30A. The forward end portion of longitudinal rails 34 and 36 can then be lowered either by use of lift bar 58 or by slowly rotating hand wheel 70 to unwind web 68. After the forward portion of the rack has been lowered (as shown in FIG. 3) the rearward portion can be lowered by grasping handle 56 to pivot lifting frame strut 48 and thereby lifting frame strut 52 back toward the position shown in FIGS. 1 and 2.

The lawn mower rack system of this invention has advantages over other known systems for elevationally positioning lawn mowers. First, it is economically constructed of readily available structural steel components and yet is sturdy and secure to reduce the possibility of injury from a falling lawn mower. Secondly, it is easily adapted to lawn mowers of various widths. Third and most important, it is easy to use.

Without any kind of mechanical jacking system, a lawn mower can be lifted by a user using a lifting force that does not exceed approximately one-half of the weight of the mower since the mower is lifted in two steps. In the same way, the mower is lowered to a floor surface to be removed in two steps. The lawn mower rack system provides easy access to the underneath of a mower since all vertical components required for lifting are spaced well away from the mower when it is in its elevated position.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A lawn mower rack comprising:

a base for resting on a floor surface having first and second spaced apart paralleled longitudinal frame members and a lateral frame member interconnecting forward ends of said longitudinal members;

first and second spaced apart paralleled vertical front posts each having a lower end secured to a said forward end of a longitudinal frame member;

first and second spaced apart paralleled longitudinal rails each adapted to receive wheels of a lawn mower thereon and a lateral rod member interconnecting forward ends of said longitudinal rails, said lateral rod member being slidably supported with respect to said front posts;

a lifting frame having a horizontal lifting bar secured to opposing lifting struts, the lifting struts being pivotally secured at first ends thereof to rearward portions of said frame members, the lifting bar being slidably positioned below rearward portions of said longitudinal rails whereby when said lifting frame is moved from a horizontal to a vertical position said rearward portions of said longitudinal rails are elevated with respect to said base; and a lifter secured with respect to said lateral frame member by which said forward ends of said longitudinal rails may be simultaneously raised to and supported at an elevated position with respect to said base.

2. A lawn mower rack according to claim 1 including:

releasable hooks for retaining said longitudinal rails at elevated positions at said front posts.

3. A lawn mower rack according to claim 1 including:

a shaft extending horizontally across top portions of said vertical front posts;

a crank attached to one end of said shaft by which said shaft can be rotated; and a flexible web having one end portion wound on said shaft and an opposite end portion affixed to said lateral rod member whereby said forward ends of said longitudinal rails may be lifted by rotation of said crank.

4. A lawn mower rack according to claim 3 wherein said crank is in the form of a wheel.

5. A lawn mower rack according to claim 1 wherein said lifting frame has a handle extending therefrom by which said lifting frame can be pivoted from a horizontal to a vertical position to elevate rearward portions of said longitudinal rails.

6. A lawn mower rack comprising;

a rectangular structural base having a forward end and a rearward end;

first and second spaced apart paralleled longitudinal rails resting on said base and configured to receive wheels of a lawn mower thereon;

a lifting frame having a horizontal lifting bar secured to opposed lifting struts, the lifting struts being pivotally secured at first ends thereof to rearward portions of said structural base, the lifting bar being slidably positioned below rearward portions of said longitudinal rails whereby when said lifting frame is moved from a horizontal to a vertical position said rearward portions of said longitudinal rails are elevated with respect to said base; and a lifter for elevationally supporting forward portions of said longitudinal rails.

7. A lawn mower rack comprising;

a structural base for resting on a support surface;

first and second spaced apart longitudinal rails supported by said base and adapted to receive wheels of a lawn mower thereon;

a first lifter for elevationally supporting rearward portions of said longitudinal rails above said bases in the form of a lifting frame having a horizontal lifting bar secured to opposed lifting struts, the lifting struts being pivotally secured at first ends thereof to rearward portions of said structural base, the lifting bar being slidably positioned below rearward portions of said longitudinal rails whereby when said lifting frame is moved from a horizontal to a vertical position said rearward portions of said longitudinal rails are elevated with respect to said base; and a second lifter independent of said first lifter, for elevationally supporting forward portions of said longitudinal rails above said base.

* * * * *